(12) United States Patent
Morikiyo et al.

(10) Patent No.: US 6,170,650 B1
(45) Date of Patent: Jan. 9, 2001

(54) CONVEYOR SYSTEM WITH DRIVE AND DRIVEN CARRIERS SUPPORTING THEREON A LOAD-SUPPORT MEMBER

(75) Inventors: Akira Morikiyo, Tokorozawa; Mitsuo Anzai, Hanno, both of (JP)

(73) Assignee: Tsubakimoto Chain Co., Osaka (JP)

( * ) Notice: Under 35 U.S.C. 154(b), the term of this patent shall be extended for 0 days.

(21) Appl. No.: 09/340,231

(22) Filed: Jul. 1, 1999

(30) Foreign Application Priority Data

Jul. 2, 1998 (JP) .................................................. 10-187927
Nov. 16, 1998 (JP) .................................................. 10-325566

(51) Int. Cl.⁷ .................................................. B65G 29/00
(52) U.S. Cl. .................................... 198/867.14; 198/465.1
(58) Field of Search ............................. 198/465.1, 465.2, 198/867.14, 867.15, 348.2, 345.3; 104/172.3, 172.5, 172.1

(56) References Cited

U.S. PATENT DOCUMENTS

| | | | |
|---|---|---|---|
| 1,168,905 | * | 1/1916 | Paridon ............................ 198/867.14 |
| 2,514,104 | * | 7/1950 | Sutherland ......................... 198/343.2 |
| 3,150,765 | * | 9/1964 | Ellis ................................. 198/867.14 |
| 4,930,619 | * | 6/1990 | Fischer et al. ............... 198/867.14 X |
| 5,303,655 | * | 4/1994 | Summa et al. ................ 198/345.3 X |

\* cited by examiner

*Primary Examiner*—James R. Bidwell
(74) *Attorney, Agent, or Firm*—Dann, Dorfman, Herrell and Skillman, P.C.; Henry H. Skillman

(57) ABSTRACT

A conveyor system includes a drive carrier and a driven carrier movably supported by guide rails via guide rollers rotatably mounted thereon. The drive carrier is connected in driven relation to a conveyor chain. A load-support member composed of a flatbed truck has front and rear engagement plugs removably received in a socket of the driven carrier and a socket of the drive carrier, respectively. The flatbed truck is conveyed in the same direction as the movable carrier while the overall weight of the flatbed truck is supported by the drive and driven carriers. At a curved portion of the conveyance path, the driven carrier is caused to move relative to the drive carrier to cancel out a difference between the length of a part of the curved conveyance path portion between the engagement plugs and the distance of a straight-line between the engagement plugs.

15 Claims, 11 Drawing Sheets

CONVEYOR SYSTEM WITH DRIVE AND DRIVEN CARRIERS SUPPORTING THEREON A LOAD-SUPPORT MEMBER

BACKGROUND OF THE INVENTION

1. Field of the Invention

The present invention relates generally to a conveyor system for transporting flatbed trucks, skids or the like (hereinafter occasionally referred to as "load-support members") through a yard or a plant with or without a load being carried on each load-support member. More particularly, the present invention relates to a conveyor system including driven and driven carriers on which the load-support members are supported.

2. Description of the Related Art

Various types of conveyors are used for transporting load-support members, such as flatbed trucks or skids, through a yard or a plant.

In an automated vehicle assembly line, works such as vehicle bodies are painted, then transferred into a drying oven for drying the coated paint while they are carried on flatbed carriages or trucks. FIGS. 11 and 12 exemplify a conventional flatbed truck used for transporting the painted vehicle bodies through the drying oven. The conventional truck A1 has four flanged wheels A2 (two being shown) rotatably mounted to the underside of a body of the truck A1. The wheels A4 are carried on a pair of guide rails A4 fixed to a support frame or base A3 placed on a floor surface A of the drying oven. The truck A1 travels along the guide rails A4 as it is pulled or dragged by a truck conveyor A5 located centrally between the guide rails A4.

When the truck A is advanced along a curved path, the wheels A2 fail to smoothly move through a curved portion of the guide rails A4 due to a relatively small radius of curvature of the curved path. To cope with this problem, the conventional flatbed truck further has four casters A6 mounted on the underside of the truck body interiorly of the wheels A2. The casters A6 thus provided act for the wheels A2 in supporting truck A1.

As shown in FIG. 12, the curved path is devoid of the guide rails A4 (FIG. 11) on which the wheels A2 are supported, but it includes a pair of laterally spaced guide tracks A7 attached to a support frame A8 for supporting thereon the casters A6.

The truck conveyor A5 has a succession of trolleys A11 (only one being shown) each supported by two pair of guide rollers A10 received in a pair of confronting channel-shaped guide rails A9 for rolling movement along the guide rails A9.

The trolley A11 is connected to a conveyor chain A12 so as to suspend the conveyor chain A12, as shown in FIG. 13. The trolley A11 supports a pusher dog A13 and a retainer dog A14 above the guide rails A9 so that these dogs A13, A14 are pivotally movable about pivot pins A15, A16, respectively.

A tow pin A17 provided on the underside of the body of the truck A1 is inserted between the pusher dog A13 and the retainer dog A14. When the conveyor chain A12 is driven, the pusher dog A13 pushes the tow pin A17 forward to thereby advance the truck A1.

FIG. 14 shows a conventional roller conveyor for transporting works via skids. The roller conveyor B1 includes a number of support frame or base B2 installed on a floor surface along a conveyance path, a series of flanged free or idle rollers B3 arranged along the conveyance path and each supported on one end of each support frame B2, and a series of drive rollers B4 arranged along the conveyance path and each supported on the other end of each support frame B2 in confronting relation to the corresponding flanged idle roller B3.

Each of the flanged idle rollers B3 is freely rotatable about a horizontal axis and supports thereon the undersurface of a roller engagement portion t of one leg B6 of the skid B5 while opposite sides of the roller engagement portion t are guided between opposite annular flanges F, F of the flanged idle roller B3.

Each of the drive rollers B4 carries thereon the undersurface of the other leg B6 of the skid B5. Upon rotation of the drive rollers B4, the skids B5 is conveyed along the conveyance path.

In the conventional conveyor system shown in FIGS. 11–13, because the wheels A2 are fixed in orientation relative to the tuck body, the flatbed truck A1 can travel along the guide rails A4 extending along a straight-line conveyance path or a gently curved conveyance path. For enabling the flatbed truck A1 to travel along a curved conveyance path with small radius of curvature, the casters A6 designed to roll along the caster tracks A7 must be used in place of the wheels A2.

Thus, the flatbed truck A1 is rendered complicated in construction and increases the equipment cost due to the necessity of the guide rails A and the caster tracks A7.

In the roller conveyor B1 shown in FIG. 14, one leg B6 of the skid B5, which in general is made relatively long in the conveyance direction, is guided between the respective annular flanges F of the idle rollers B3. Accordingly, at a curved portion of the conveyance, smooth conveyance of the skid B5 is difficult to achieve. To cope with this problem, a turntable is used to change the direction of the skid. However, use of the turntable may pose a limitation about the layout design of conveyance path.

According to another conventional attempt, a trolley conveyor is employed in which a skid is conveyed while being carried on carriages. However, the trolley conveyor requires a large vertical conveyance space. Additionally, since the carriages have substantially the same area as the skids, the carriages occupy a large area even when they move along a return path with no loads carried thereon.

Furthermore, conventional slat conveyors used for conveyance of the flatbed trucks or the skids are not successful because in order to transport the tracks or the skids along a curved path, a turntable must be used to change the direction of the tracks or the skids.

Additionally, since the conveyors disposed in different processing stations each have a particular design well suited for a process achieved in the corresponding station, the conventional conveyor systems are unable to handle different types of load-support members, such as trucks and skids, without reconstruction of conveyors.

SUMMARY OF THE INVENTION

It is accordingly an object of the present invention to provide a conveyor system which is free from the foregoing problems, and can smoothly transport load-support members, such as flatbed trucks or skids, through different processing stations along a conveyance path including a curved portion, without requiring a large area for installation thereof.

To achieve the foregoing object, a conveyor system according to the present invention includes at least one guide rail, a flexible drag member driven to travel along the guide rail, and a drive carrier movably supported by the rail via a first roller means rotatably mounted on the drive carrier. The drive carrier has a drive socket projecting above the guide rail, and a portion connected in driven relation to the drag member for movement along the guide rail. A driven carrier is movably supported by the rail via a second roller means rotatably mounted on the driven carrier. The driven carrier has a driven socket projecting above the guide rail. A load-support member for supporting thereon a load to be transported by the conveyor system has a pair of downwardly projecting engagement plugs at a front portion and a rear portion thereof, respectively. One of the engagement plugs is removably received in the drive socket and the other engagement plug is removably received in the driven socket. The load-support member is driven to move in the same direction as the drive carrier while the overall weight of the load-support member is supported by the drive and drive carriers.

With this construction, the overall weight of the load-support member is supported by the drive and driven carriers which are preferably located on a longitudinal centerline of the load-support member. The drive carrier driven by the drag member drives the load-support member to move in the same direction as the drive carrier via the engagement between the drive socket and the engagement plug received therein.

In this instance, the engagement plug received in the driven socket forces the driven socket in the forward direction to thereby advance the driven carrier along the guide rails in synchronism with the advancing movement of the drive carrier.

At a curved portion of the guide rails, the driven carrier not connected to the conveyor chain is caused to move in a direction separating away from the drive carrier, so that a difference between the length of a curved rail portion extending between the front and rear engagement plugs and the distance in a straight line between the engagement plugs is taken up or canceled.

In one preferred form of the present invention, the guide rail is a channel-shaped guide rail disposed with its open side facing in a horizontal direction. The drive carrier is pivotally connected at the portion to the drag member. The first roller means of the drive carrier comprises a pair of guide rollers disposed on opposite sides of the pivoted portion of the drive carrier and rotatably received in the channel-shaped guide rail. The second roller means of the driven carrier comprises a pair of guide rollers rotatably receive din the channel-shaped guide rail.

The at least one guide rail may be a pair of channel-shaped guide rails disposed in parallel juxtaposition with their open sides facing each other in a horizontal plane. In this case, the guide rollers of the drive carrier and the guide rollers of the driven carrier are rotatably receive din each of the pair of guide rails. The first roller means further includes a pair of additional guide rollers guided by opposite longitudinal edges of upper flanges of the pair of channel-shaped guide rails, and the second roller means further includes a pair of additional guide rollers guided by the opposite longitudinal edges of the upper flanges of the pair of channel-shaped guide rails.

The drive socket may have an upwardly open vertical engagement recess for receiving therein said one engagement plug, and an engagement surface defining part of the engagement recess and engaged with said one engagement plug to advance the load-support member when the drive carrier is driven by the drag member. The engagement recess has an upper portion opening in a forward direction of the drive carrier for accepting entry of said one engagement plug in the engagement recess from the forward direction of the drive carrier.

The drive socket may further have a retainer surface forming a part of the engagement recess diametrically opposite to the engagement surface. The retainer surface is engageable with said one engagement plug to prevent said one engagement plug from displacing off the drive socket in the forward direction of the drive carrier. Preferably, the engagement recess in the drive socket has a size and configuration to allow said one engagement plug to tilt in a vertical plane within the engagement recess.

Preferably, the driven carrier has the same construction as the driven carrier, but it is not connected to the drag member.

It is preferable that the engagement plugs each include a vertical support shaft, and a roller rotatably mounted on the support shaft and having an annular seating flange at an upper end thereof. The drive and driven sockets each have a load-bearing surface at an upper end thereof. The load-bearing surface is in contact with the seating flange when the load-support member is carried on the drive and driven carriers.

Each of the engagement plugs may further include an annular retaining seat made of a low friction material and disposed around the support shaft between the annular seating flange and a body of the load-support member. The retaining seat is normally separated from the annular seating flange and is brought into contact with the seating flange when the load-support member is carried on the drive and driven carriers.

The driven carrier may be disposed on a forward side or a rearward side of the drive carrier when viewed from the direction of conveyance of the load-support member.

The conveyor system may further include a pair of floating restriction trolleys disposed on a forward side and a rearward side, respectively, of the driven carrier and connected to the drag member. The floating restriction trolleys are engageable with the driven carrier to restrict floating movement of the driven carrier within a predetermined range.

The load-support member may be a flatbed truck or a skid.

The above and other objects, features and advantages of the present invention will become apparent to those versed in the art upon making reference to the following detailed description and the accompanying sheets of drawings in which certain preferred structural embodiments incorporating the principle of the present invention are shown by way of illustrative examples.

DETAILED DESCRIPTION OF THE PREFERRED EMBODIMENTS

Figure 1:
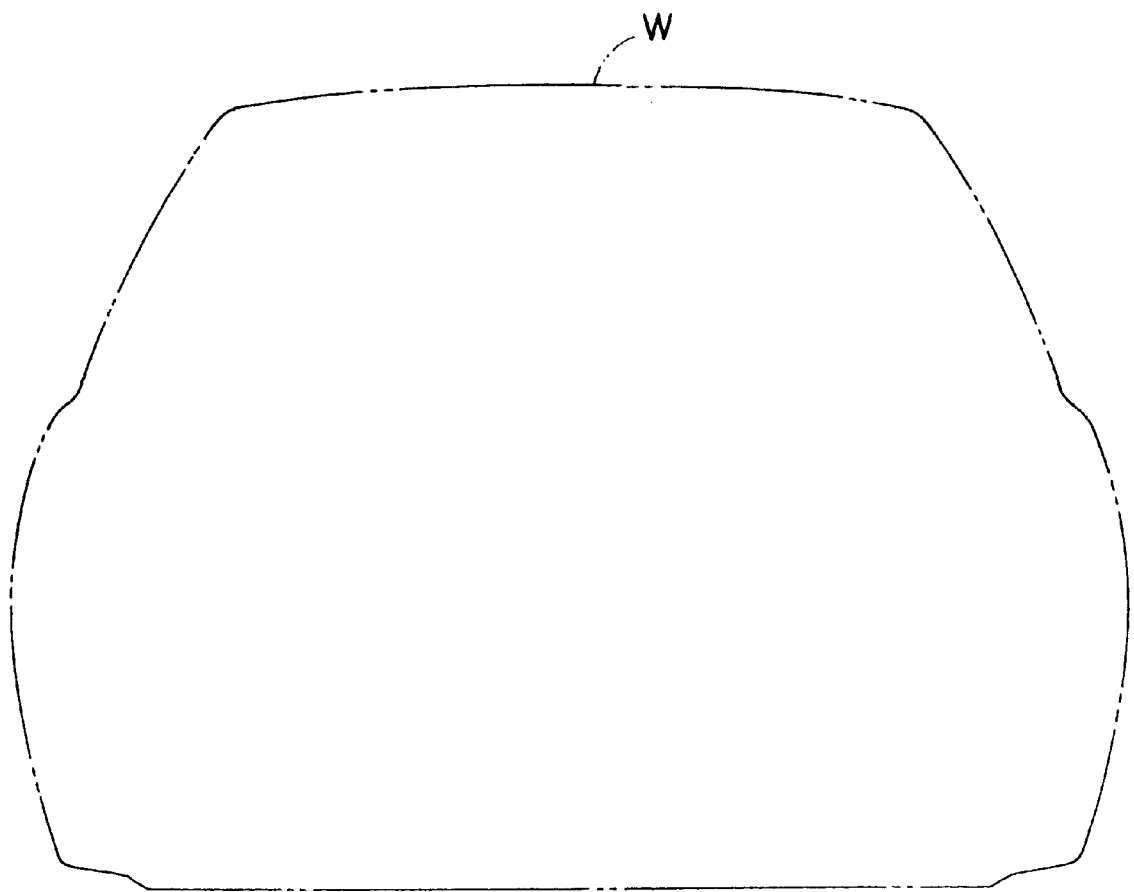
FIG. 1 is a vertical cross-sectional view of a conveyor system according to a first embodiment of the present invention.

Certain preferred structural embodiments of the present invention will be described in greater detail with reference to the accompanying drawings, wherein like reference characters designate like or corresponding parts throughout the several views.

FIG. 1 shows in cross section a conveyor system embodying the present invention for transporting flatbed trucks (load-support members) through an oven for drying painted works such as vehicle bodies carried on the trucks. The conveyor system 1 includes a pair of channel-shaped guide rails 3, 3 disposed in parallel juxtaposition with their open sides facing horizontally each other. The guide rails 3, 3 are supported above a floor surface G of a drying oven (not shown) by means of a support frame 2. The conveyor system 1 further includes a conveyor chain 4 driven by a drive unit (not shown) to circulate below the guide rails 3, 3 along the guide rails, 3, 3. The conveyor chain 4 forms a drag member.

A drive carrier and a driven carrier (both described later) are movably mounted on the guide rails 3, 3 via guide rollers 5, 6. The drive carrier is connected to the conveyor chain 4.

A flatbed carriage or truck 7 is conveyed by the conveyor chain 4 while an overall weight of the flatbed truck 7 is supported by the drive and driven carriers with wheels 8 of the flatbed truck 7 being spaced upwardly from the floor surface G (namely, the wheels 8 are floating in the air). The wheels 8 are provided to ensure that the flatbed truck 7 can travel along guide rails (not shown) installed on a floor surface of a plant excluding the drying oven.

Figure 2:
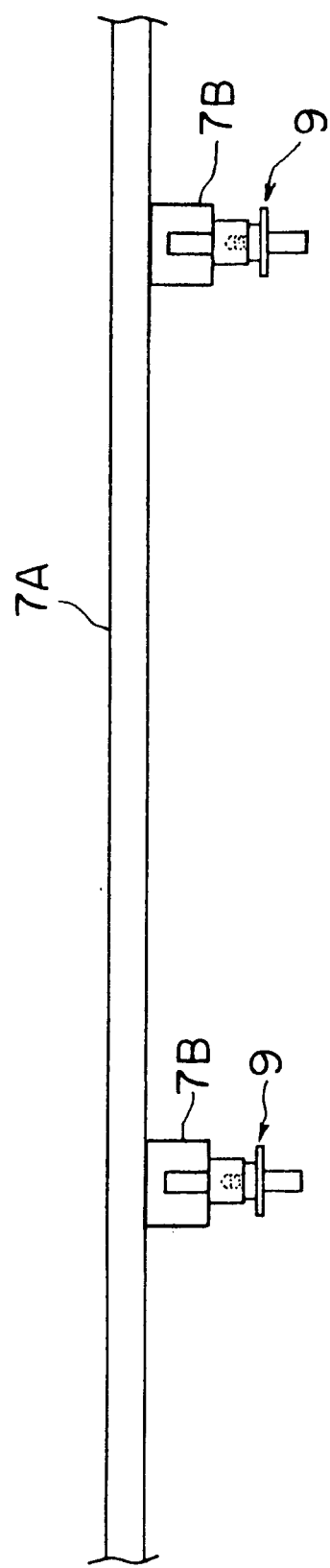
FIG. 2 is a side view of engagement plugs of a flatbed truck taken in the direction of the arrow C shown in FIG. 1.
Figure 3:
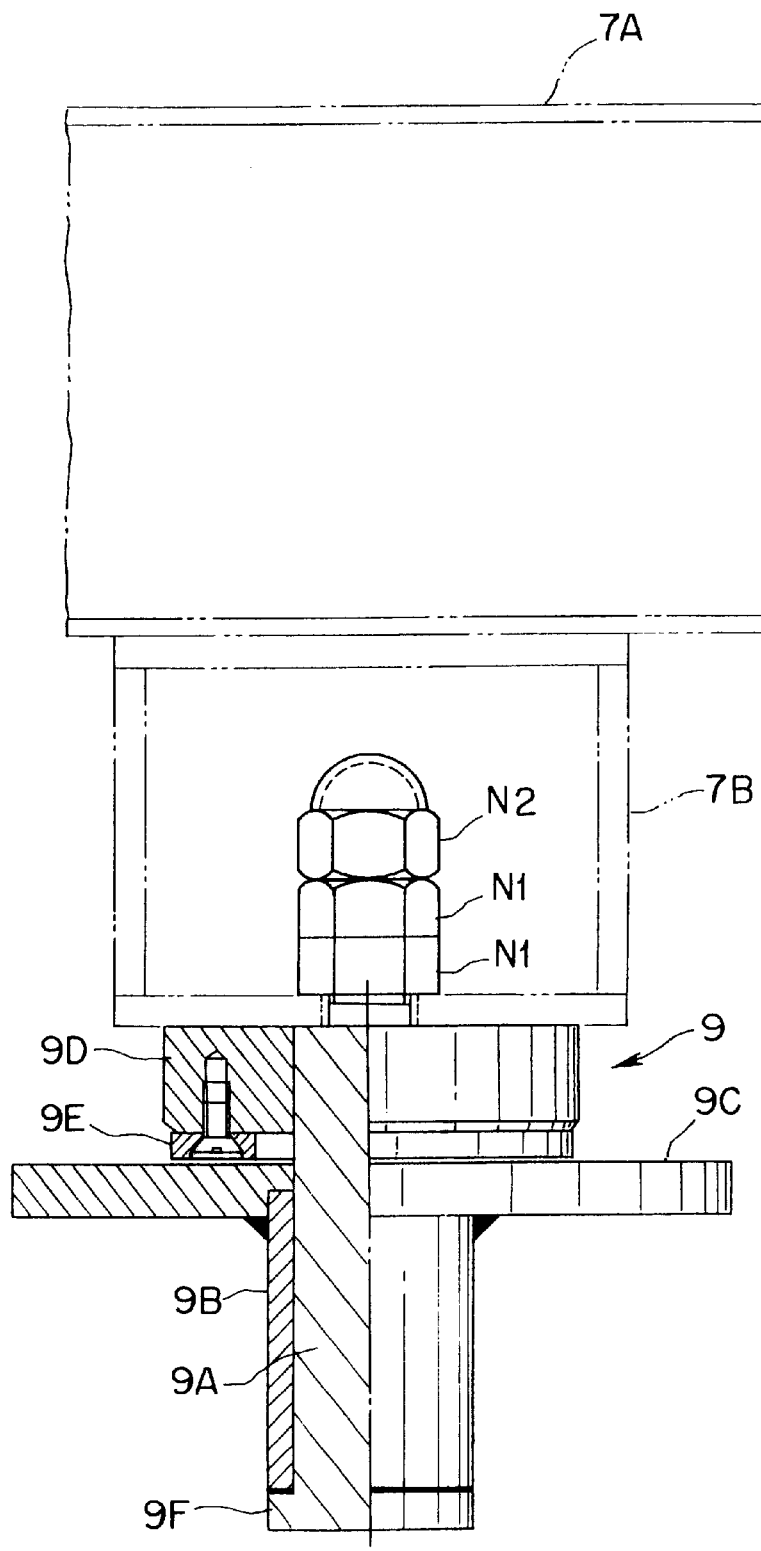
FIG. 3 is an enlarged view, partly in cross section, of one of the engagement plugs.

The flatbed truck 7, as shown in FIG. 2, has a pair of engagement plugs 9, 9 projecting downwardly from a front portion and a rear portion, respectively, of a body of the flatbed truck 7. The engagement plugs 9 are disposed on a longitudinal centerline of the flatbed truck 7. More specifically, each of the engagement plugs 9 is attached to a mounting frame 7B. The mounting frame 7B is attached by welding to the underside of a longitudinal beam 7A secured to the underside of the flatbed truck body along the longitudinal centerline of the flatbed truck 7. As shown in FIG. 3, the engagement plugs 9 each include a support shaft 9A tightly secured at an upper end to the mounting frame 7B by means of a double nut N1 and a cap nut N2, an engagement roller 9B rotatably supported on the support shaft 9A, and an annular seating flange 9C secured by welding to an upper end of the engagement roller 9B.

The support shaft 9A extends through a support ring 9D disposed between the mounting frame 7B and the annular seating flange 9C. The support ring 9D is fixed to an undersurface of the mounting frame 7B. An annular retaining seat 9E is attached by screws (one being shown) to an undersurface of the support ring 7D. The retaining seat 9E is made of a low friction material, is concentrical to the support shaft 9A, and has an undersurface facing an upper surface of the annular seating flange 9C.

The support shaft 9A has an annular flange 9F at a lower end thereof to support or retain the engagement roller 9B from below. With the flange 9F thus provided, the engagement roller 9B rotatably mounted on the support shaft 9A is prevented from displacing off the support shaft 9A. In the normal condition where the lower end of the engagement roller 9B is in contact with the annular flange 9F of the support shaft 9A, the upper surface of the annular seating flange 9C and the undersurface of the retaining seat 9E are separated from each other by a small space or clearance so that the engagement roller 9B including the seating flange 9C is freely rotatable about an axis of the support shaft 9A.

Figure 4:
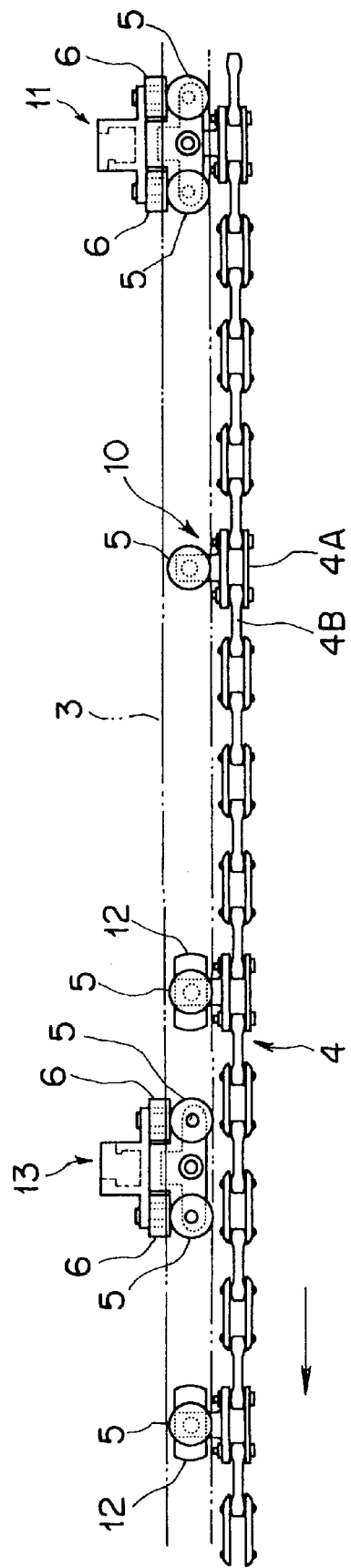
FIG. 4 is a fragmentary side view showing movable parts of the flatbed truck conveyor system.

As shown in FIG. 4, the conveyor chain 4 includes a great number of links 4A, 4B pined together in such a manner that the conveyor chain 4 is freely bendable in a horizontal plane and can be bent to some extent in a vertical direction. A suspension trolley 10 is provided on an upper part of each of selected links 4A spaced at equal intervals along the length of the conveyor chain 4. The suspension trolley 10 has a pair of rollers 5 (one being shown) rotatably mounted thereon on opposite sides of the suspension trolley 10. The rollers 5 are supported by the guide rails 3 so that the conveyor chain 4 is guided along the guide rails 3.

The conveyor chain 4 further has a drive carrier 11 and a pair of front and rear floating restriction trolleys 12 both disposed forward of the drive carrier 11 when viewed in the direction of travel of the conveyor chain 4. The drive carrier 11 and the floating restriction trolleys 12 are attached to the conveyor chain 4 in the same manner as the suspension trolley 10. The drive carrier 11 is supported by the guide rails 3 via guide rollers 5, 6 and movable along the guide rails 3. The floating restriction trolleys 12 are supported by the guide rails 3 via guide rollers 5 and movable along the guide rails 3.

A driven carrier 13 is disposed between the front and rear floating restriction trolleys 12. The driven carrier 13 is supported by the guide rails 3 via guide rollers 5, 6 and movable along the guide rails 3.

Figure 5:
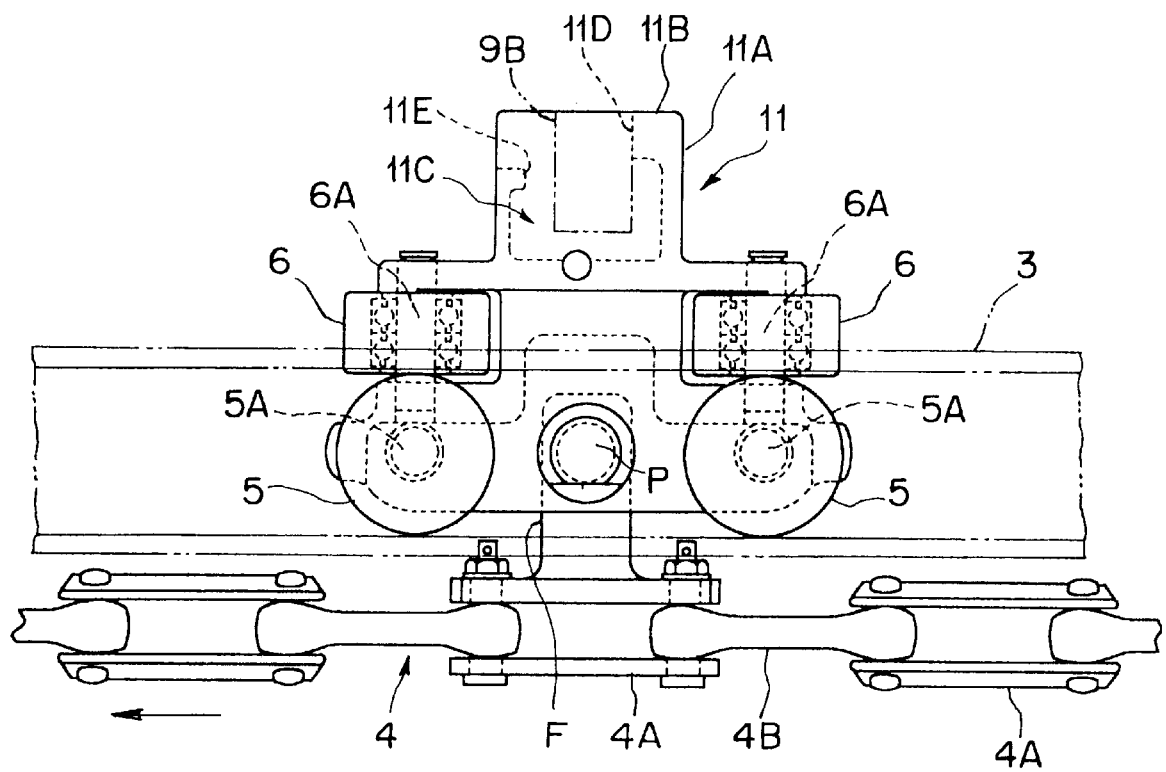
FIG. 5 is a side view of a drive carrier of the flatbed truck conveyor system.
Figure 6:
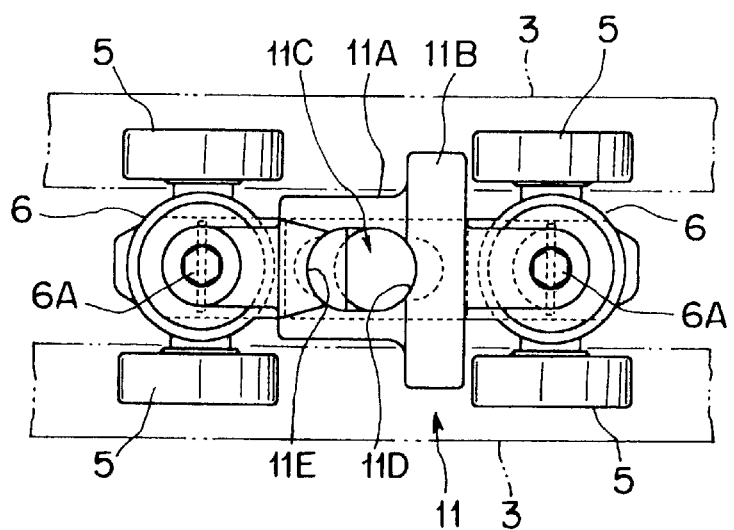
FIG. 6 is a plan view of the drive carrier.

As shown in FIG. 5, the drive carrier 11 has a longitudinal central portion pivotally connected by a horizontal connecting pin P to a vertical connecting portion or lug F projecting upwardly from an upper portion of one link 4A into a space defined between the pair of guide rails 3, 3 (FIG. 6).

The drive carrier 11 has a pair of horizontal fixed roller shafts 5A disposed on a front and a rear side, respectively, of the connecting pin P. Two guide rollers 5 are rotatably mounted on opposite end portions of each horizontal fixed roller shaft 5A via bearings (not shown). At a junction between a horizontal conveyance path and a sloped conveyance path, the drive carrier 11 tilts or turn about the horizontal connecting pin F to thereby improve the follow-up performance of the guide rollers 5 with respect to undulations of the guide rails 3.

The drive carrier 11 further has a pair of vertical fixed roller shafts 6A each disposed centrally between one pair of guide rollers 5. Each of the vertical fixed roller shafts 6A rotatably supports a guide roller 6 via a bearing (not designated). The guide roller 6 is located at a higher level than an upper end of the guide rollers 5. The guide rollers 6 are guided by opposite longitudinal edges of upper flanges of the channel-shaped guide rails 3 so that the drive carrier 11 can smoothly move along the guide rails 3 without meandering in a horizontal plane.

The drive carrier 11 is provided with a vertical drive socket 11A projecting upwardly from the space between the guide rails 3. The drive socket 11A has a load-bearing surface 11B at an upper end thereof, and an internal engagement hole or recess 11C. The engagement recess 11C has an upper portion opening in the forward direction of the drive carrier 11 and also opening at the load-beating surface 11B. The forwardly open supper portion of the engagement recess 11C is flared outwardly so that the rear engagement plug 9 (FIGS. 2 and 3) of the flatbed truck 7 is smoothly introduced into the engagement recess 10C through the the upper portion of the engagement recess 10C, then held within the engagement recess 10C with the engagement roller 9B (indicated by the phantom lines in FIG. 5) held in abutment with an arcuate rear engagement surface 11D of the drive socket 11A.

The load-bearing surface 11B is designed to support the undersurface of the seating flange 9C when the engagement roller 9B of the engagement plug 9 is in abutment with the rear engagement surface 11D of the drive socket 11A.

The drive socket 11A further has an arcuate retainer surface 11E bordering a part of the engagement recess 11C at a position diametrically opposite to the rear engagement surface 11D. The retainer surface 11E is located at a level such that when the seating flange 9C of the engagement plug 9 is supported on the load-bearing surface 11B, the retainer surface 11E is disposed in confrontation to, and hence is engageable with, a lower portion of the engagement roller 9B. The retainer surface 11E can prevent the engagement plug 9 from being removed forward from the engagement recess 11C.

Figure 7:
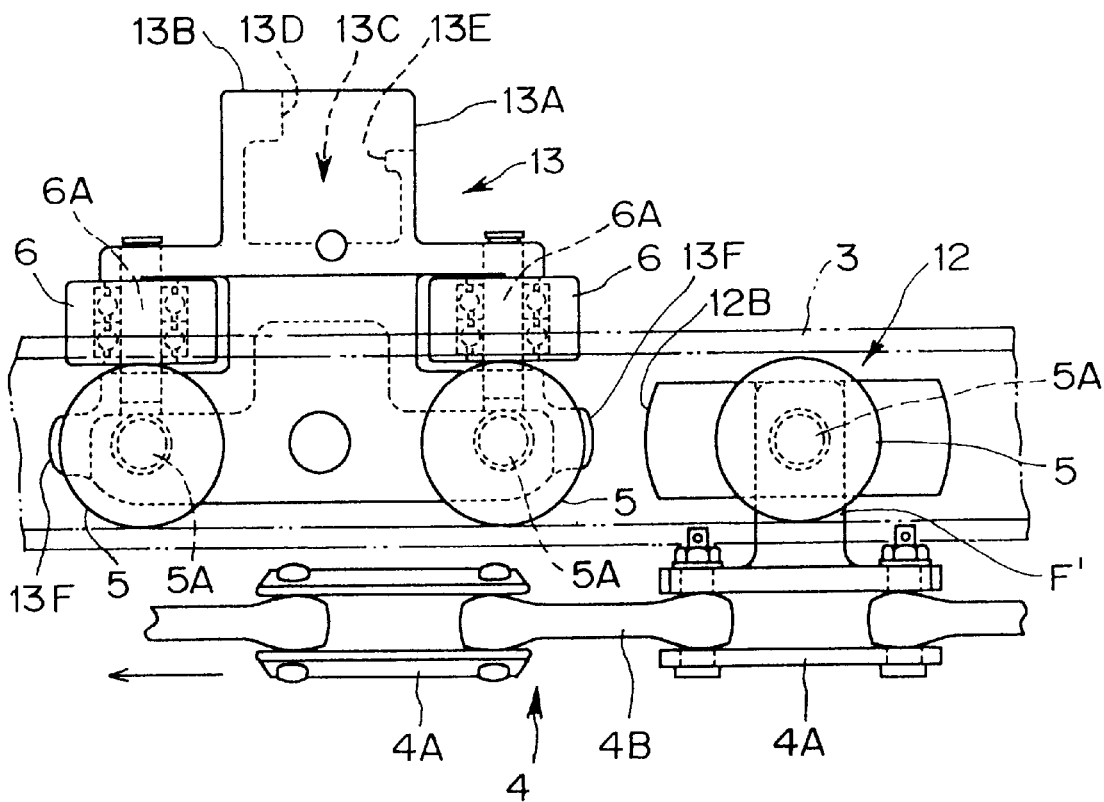
FIG. 7 is a side view of a driven carrier and a floating restriction trolley of the flatbed truck conveyor system.
Figure 8:
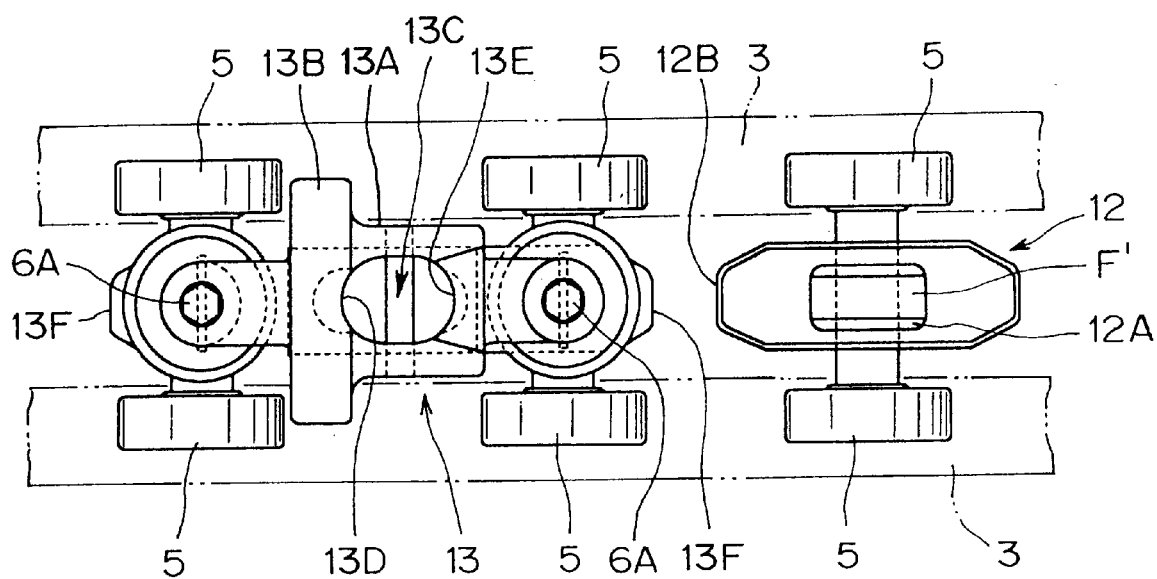
FIG. 8 is a plan view of the driven carrier and the floating restriction trolley.

As shown in FIGS. 7 and 8, each of the floating restriction trolleys 12 (rear trolley being shown) has a substantially rectangular vertical engagement hole 12A (FIG. 8) fitted with a vertical connecting portion or lug F' projecting upwardly from an upper portion of the link 4A into the space between the guide rails 3. The floating restriction trolley 12 further has a horizontal fixed roller shaft 5A extending through a body of the trolley 12 transversely across the engagement hole 12 and the connecting lug F' received therein so that the floating restriction troller 12 is connected to the conveyor chain 4. Two guide rollers 5 are rotatably mounted on opposite end portions of the fixed roller shaft 5A via a pair of bearings (not shown), respectively. The floating restriction trolley 12 has an abutment surface 12B located centrally between the guide rollers 5, 5 and facing the driven carrier 13. The fixed roller shaft 5A and the guide rollers 5 of the floating restriction trolleys 12 are the same in construction as those of the drive carrier 11 previously described.

The driven carrier 13, like the drive carrier 11, has a pair of guide rollers 5 rotatably mounted on opposite end portions of each of a pair of horizontal fixed roller shafts 5A via a pair of bearings (not shown), respectively, and a pair of guide rollers 6, 6 rotatably mounted on a pair of vertical fixed roller shafts 6A, respectively, via a pair of bearings (not designated).

The driven carrier 13 also has a driven socket 13A projecting upwardly from the space between the guide rails 3. The driven socket 13A has the same structure as the drive socket 11A of the drive carrier 11 shown in FIGS. 5 and 6 but is oriented in a direction diametrically opposite to the drive socket 11A. The driven socket 13A has a load-bearing surface 13B at an upper end thereof.

The driven socket 13A further has an internal engagement hole or recess 13C opening in the rearward direction of the drive carrier 13 and also opening to the load-bearing surface 13B. The rearwardly open engagement recess 13C is flared outwardly so that the front engagement plug 9 (FIGS. 2 and 3) of the flatbed truck 9 can readily be introduced into the engagement recess 13C from a rear side of the driven socket 13A and is held inside the engagement recess 13C with the engagement roller 9B (FIG. 3) of the engagement plug 9 held in abutment with an arcuate front engagement surface 13D of the driven socket 13A.

The load-bearing surface 13B is designed to support the undersurface of the seating flange 9C when the engagement roller 9B of the engagement plug 9 is in abutment with the front engagement surface 13D. The driven socket 13A further has a retainer surface 13E bordering a part of the engagement recess 13C at a position diametrically opposite to the engagement surface 13D. The retainer surface 13E is located at a level such that when the seating flange 9C of the engagement plug 9 is in contact with the load-bearing surface 13B, the retainer surface 13E is disposed in confrontation to, and hence is engageable with, a lower portion of the engagement roller 9B. Thus, the engagement plug 9 is prevented by the retainer surface 13E from being removed rearward from the engagement recess 13C.

The driven carrier 13 has a front and a rear abutment surface 13F projecting forward and rearward, respectively, from a portion located centrally between the pair of guide rollers 5, 5. The driven carrier 13 is allowed to freely move about or float along the guide rails 3 within a limited range. The floating movement of the driven carrier 13 is prohibited when each of the abutment surfaces 13F of the driven carrier 13 is in abutment with a corresponding one of the abutment surfaces 12B of the front and rear floating restriction trolleys 1, 12.

In order to simplify the manufacturing process, the drive carrier 11 and the driven carrier 13 of the illustrated embodiment have the same construction. When assembling in the space between the guide rails 3, two identical carriers are disposed in either nose-to-nose confrontation, or alternatively or tail-to-tail confrontation, and one of the carriers is used as a drive carrier and the other carrier as a driven carrier. As described above, the drive carrier 11 is connected by the connecting pin P (FIG. 5) to the conveyor chain 4F, while the driven carrier 13 is separated from the conveyor chain 4.

When the flatbed truck 7 is to be transported, the front engagement plug 9 (FIG. 2) of the flatbed truck 7 is inserted in the engagement recess 13C of the driven socket 13A in such a manner that the engagement roller 9B is located substantially centrally between the engagement surface 13D and the retainer surface 13E. The seating flange 9C of the engagement plug 9 is carried on the load-bearing surface 13B of the driven carrier 13. Substantially at the same time, the rear engagement plug 9 of the flatbed truck 7 is inserted in the engagement recess 11C of the drive socket 11A in such a manner that the engagement roller 9B is located substantially centrally between the engagement surface 11D and the retainer surface 11E. The seating surface 9C of the engagement plug 9 is carried on the load-bearing surface 11B of the drive socket 11A.

In this condition, the overall weight of the flatbed truck is supported by the drive and driven carriers 11, 13 via engagement between the rear and front engagement plugs 9, 9 and the corresponding sockets 11A, 13A, and the wheels 12 of the flatbed truck 7 are upwardly spaced from the floor surface G (namely, floating in the air), as shown in FIG. 1. When the conveyor chain 4 is driven, the drive carrier 11 forcibly moves the flatbed truck 7 forward along the guide rails 3 through engagement between the drive socket 11A and the rear engagement plug 9.

In this instance, the engagement roller 9B of the front engagement plug 9 is brought into contact with the engagement surface 13D of the driven socket 13A, which then forces the engagement surface 13D forward with the result that the driven carrier 13 partly supporting the weight of the flatbed truck 7 via the driven socket 13A is advanced along the guide rails 3 in synchronism with advancing movement of the drive carrier 11.

When the flatbed truck 7 moves along a curved portion of the guide rails 3 lying in a horizontal plane, the length of the curved conveyor portion exceeds the distance between the front and rear engagement plugs 9, 9 of the flatbed truck 7. In this instance, however, since the driven carrier 13 is not connected to the conveyor chain 4, the driven carrier 13 is caused to slide along the guide rails 3 in a direction away from the drive carrier 11 as the drive carrier 11 advances. With this movement of the driven carrier 13 relative to the drive carrier 11, the flatbed truck 7 can smoothly move through the curved portion of the guide rails 3.

In this instance, since the engagement rollers 9B having the seating flanges 9C of the engagement plugs 9 are rotatably mounted on the associated vertical support shafts 9A secured to the mounting frames 7B of the flatbed truck 7, a difference in orientation between the drive carrier 11 and the driven carrier 13 can be taken up or canceled through angular movement of the engagement rollers 9B relative to the support shafts 9A. Thus, the flatbed truck 7 can smoothly make a turn along the curved portion of the guide rails 3.

When the flatbed truck 7 moves through a curved portion of the guide rails 3 lying in a vertical plane, as at a joint portion between a horizontal portion and a sloped portion of the guide rails 3, the respective sockets 13A, 11A of the driven and drive carriers 13, 11 allow the front and rear engagement plugs 9 of the flatbed truck 7 to tilt within the engagement recesses 13C, 11C. At the same time, the driven carrier 13 is caused to move along the guide rails 3 relative to the drive carrier 11. Thus, the flatbed truck 7 can smoothly pass through the vertically curved rail portion.

Figure 9:
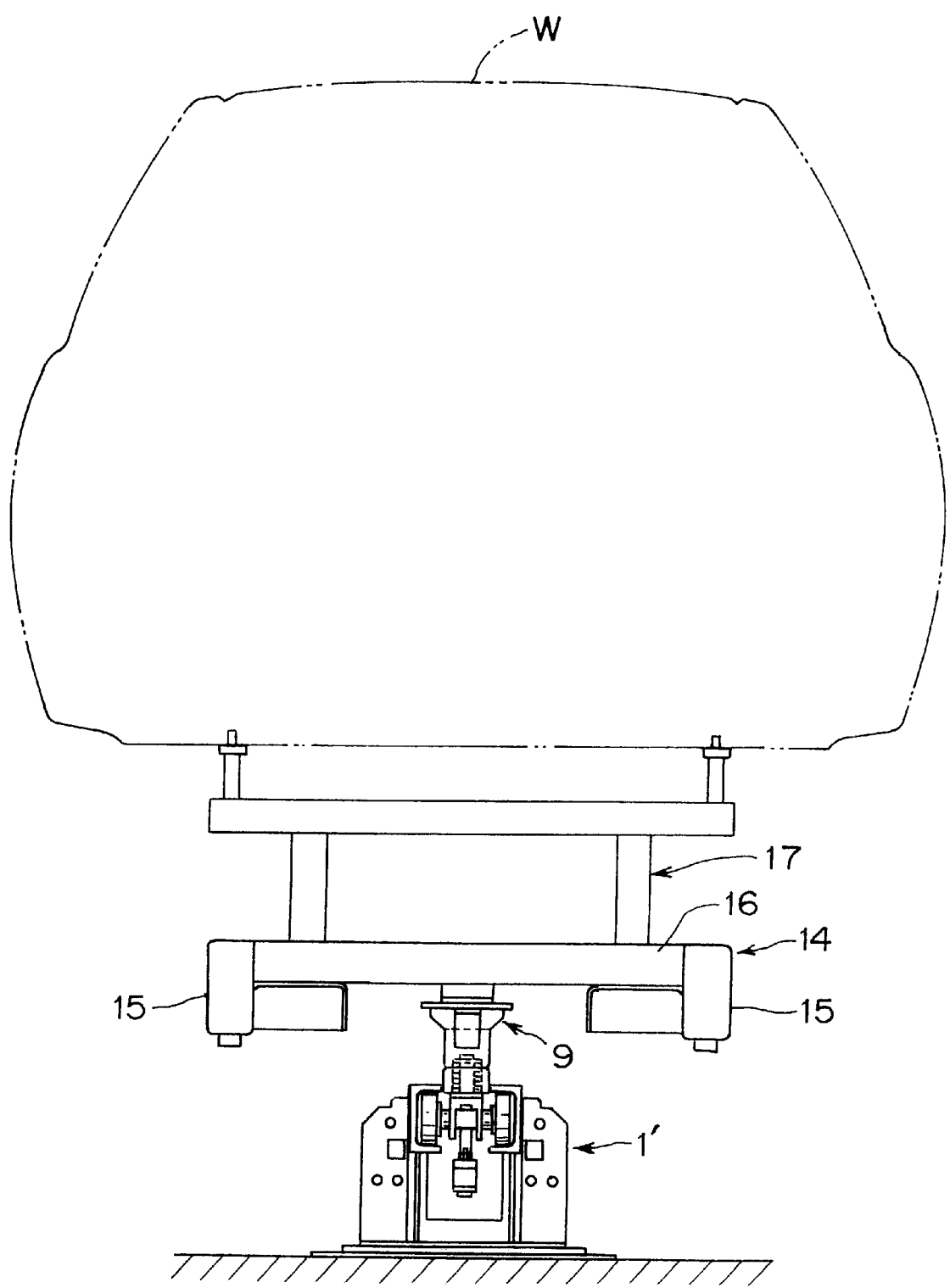
FIG. 9 is a vertical cross-sectional view of a conveyor system according to a second embodiment of the present invention

FIG. 9 shows a conveyor system according to a second embodiment of the present invention. The conveyor system 1' is substantially the same as the conveyor system 1 of the first embodiment shown in FIGS. 1–8 with the exception that the load-support member is a skid 14.

Figure 10:
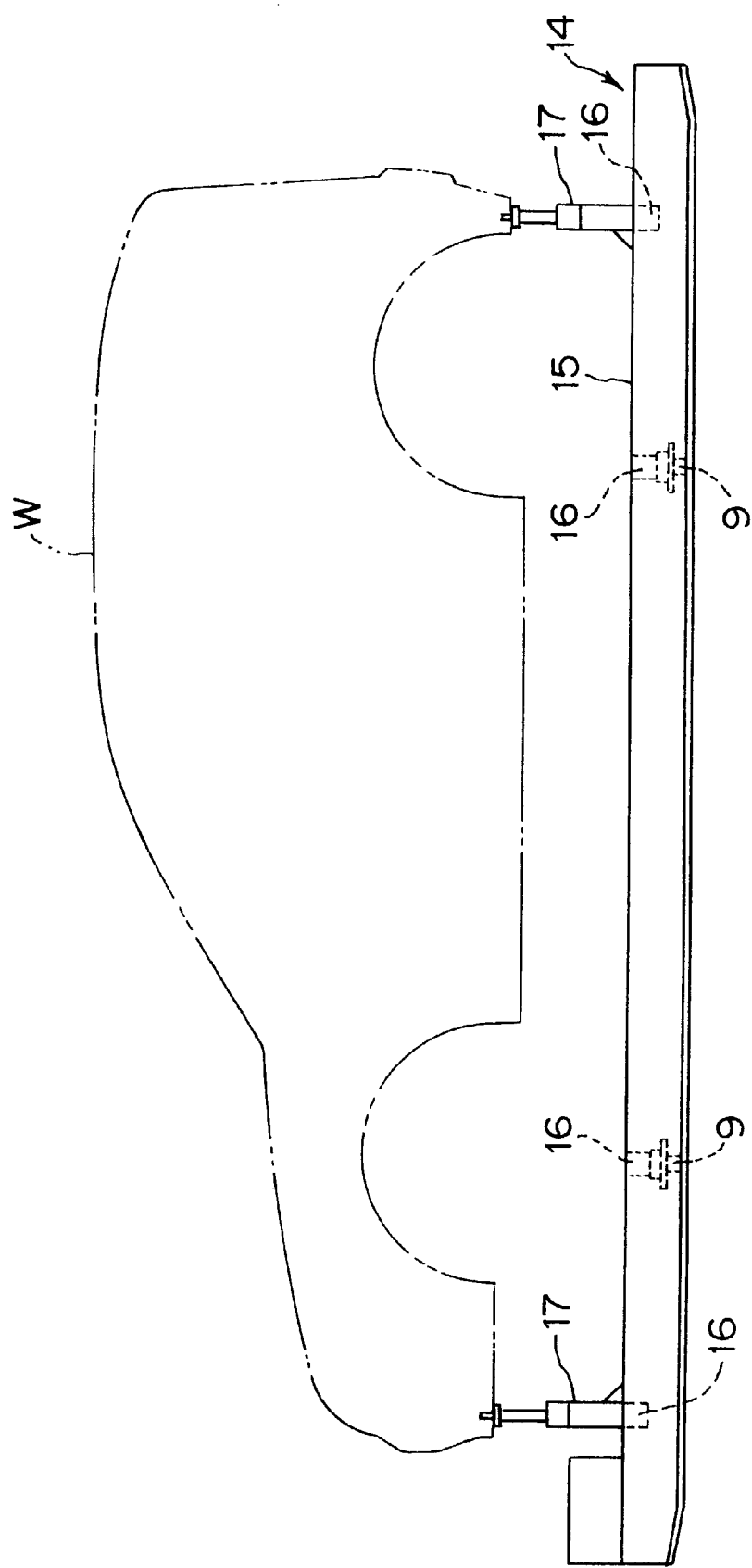
FIG. 10 is a side view of a skid of the conveyor system shown in FIG. 9.
Figure 11:
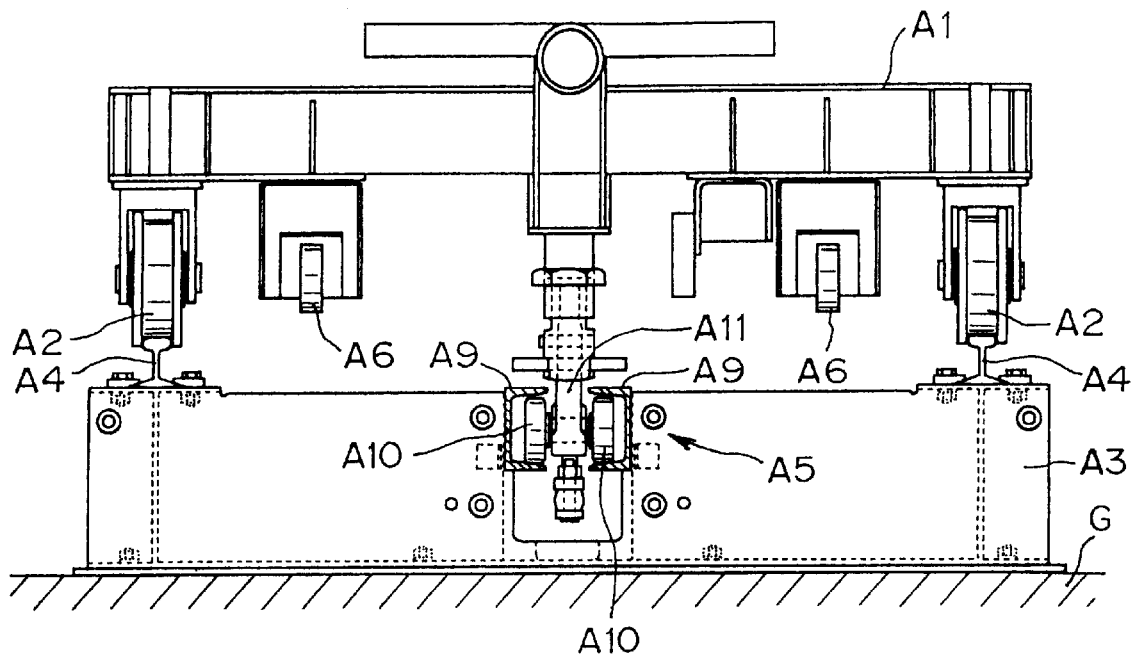
FIG. 11 is a vertical cross-sectional view of a portion of a conventional flatbed conveyor system provided along a straight conveyance path.
Figure 12:
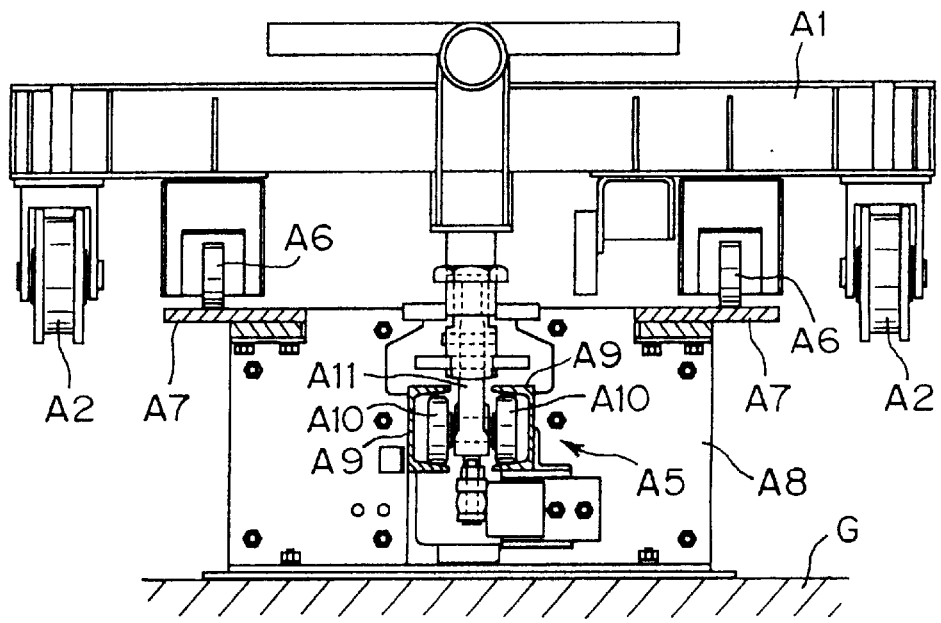
FIG. 12 is a vertical cross-sectional view of a portion of the conventional flatbed conveyor system provided along a curved conveyance path.
Figure 13:
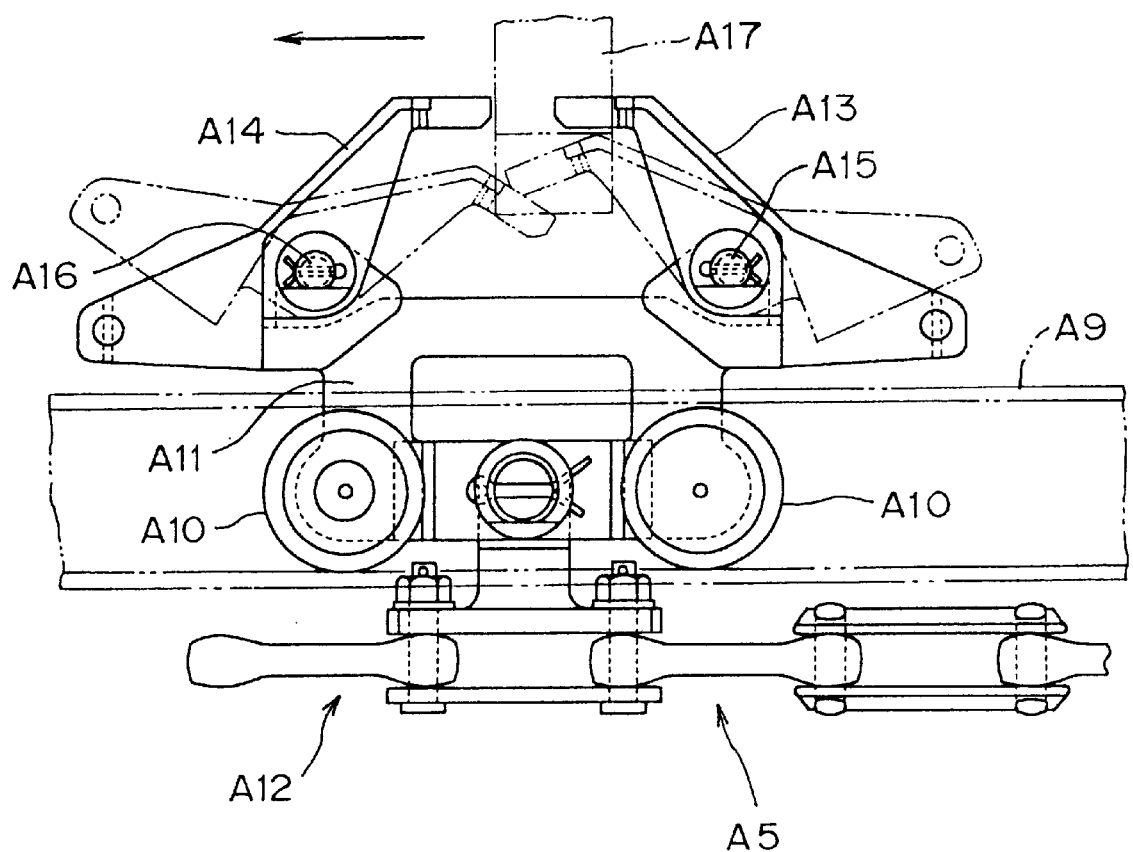
FIG. 13 us a side view showing a main portion of the conventional flatbed truck conveyor system.
Figure 14:
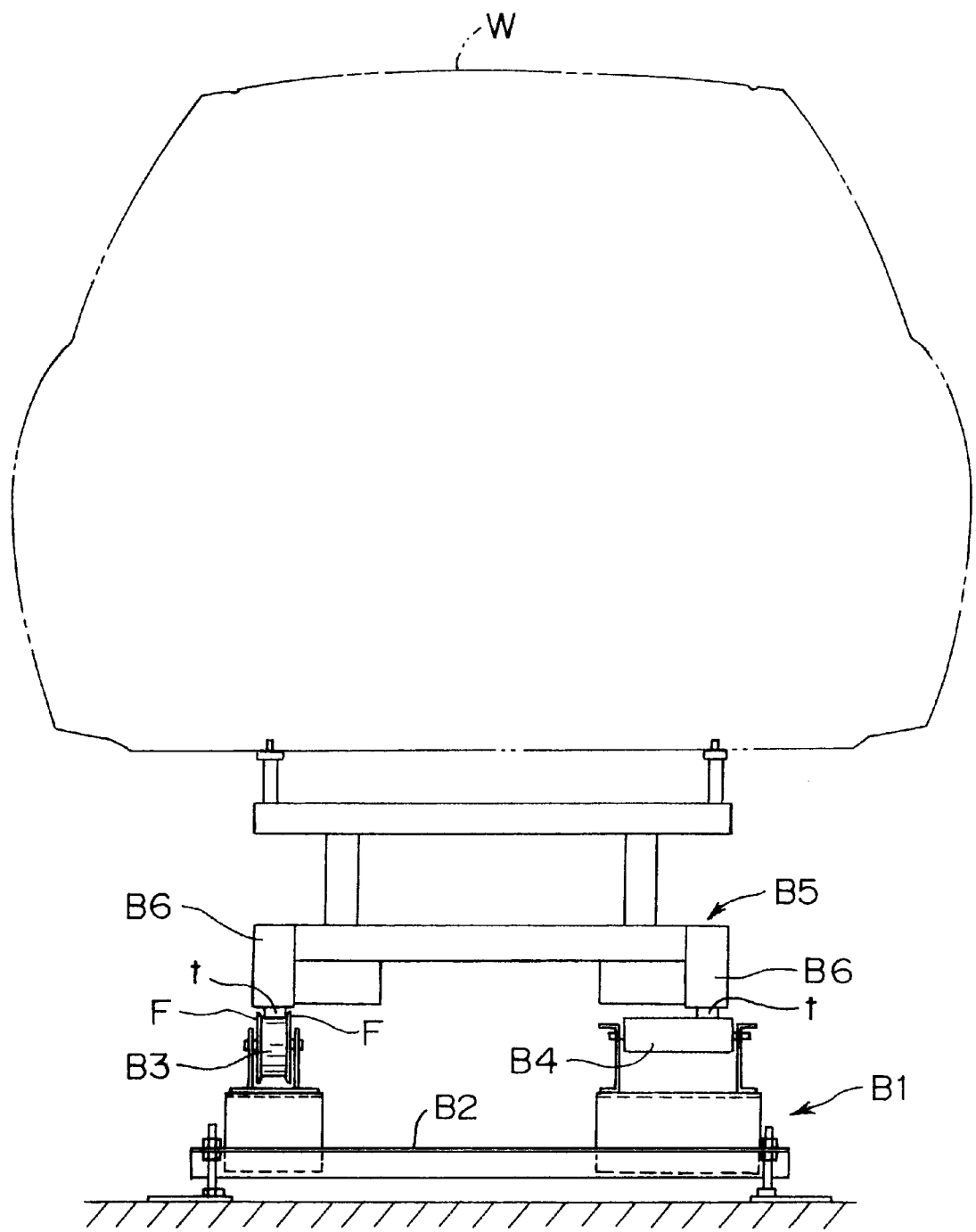
FIG. 14 is a vertical cross-sectional view of a conventional roller conveyor having skids moving along a conveyance path.

The skid 14 has a substantially rectangular body composed of a pair of parallel spaced, horizontally elongated legs 15, 15 and a plurality (four being shown in FIG. 10) of crossbars 16 extending between the legs 15 and connected at opposite ends to the legs 15. The cross bars 16 are properly spaced in the longitudinal direction of the legs 15. Endmost two crossbars 16 are each provided with one work support frame 17 by means of which a front end portion or a rear end portion of a work (vehicle body, for example) W is supported from the below.

The remaining two crossbars 16, disposed interiorly of the endmost crossbars described above, are each provided with one engagement plug 9 which is identical in construction to the engagement plug 9 of the flatbed truck 7 of the first embodiment shown in FIG. 3.

The engagement plugs 9 are disposed on a longitudinal centerline of the rectangular skid to balance a left part and a right part of the skid 14.

In the illustrated embodiments, the driven carrier 13 is located forward of the drive carrier 11 when viewed from the direction of conveyance of the load-support member 7, 14. The driven carrier 13 may be disposed rearward of the drive carrier 11.

Furthermore, the floating restriction trolleys 12 disposed on opposite sides of the driven carrier 13 may be omitted. This is because the trolleys 12 are used to limit the floating movement of the driven carrier 13 within a certain range, so as to facilitate easy positioning between one engagement plug 9 of the load-support member 7, 14 and the driven carrier 13 when the load-support member 7, 14 is set on the drive and driven carriers 11, 13.

Although in the illustrated embodiments, the drag member formed by a conveyor chain 4 (FIG. 1) is guided by the pair of guide rails 3 via suspension trolleys 10 (FIG. 4), the conveyor chain 4 may be guided along a separate guide rail disposed below the guide rails 3 in parallel relation to the guide rails 3.

In the conveyor systems 1, 1' shown in the illustrated embodiments, two channel-shaped guide rails 3 disposed in parallel horizontal juxtaposition with the open sides facing each other are used in combination with the drag member consisting of a conveyor chain 4 disposed below the guide rails 3. The number and the shape of the guide rails should be no means be limited to those of the illustrated embodiments but may include any variations provided that the guide rollers 5 of each of the drive and driven carriers 11, 13 are reliably and stably guided and supported by the guide rail. The conveyor chain 4 may be located at any other position as long as it can drive the drive carrier 11 to travel along the guide rails.

The conveyor chain 4 used as a flexible drag member may be replaced with a wire rope. Additionally, the drag member may be arranged to reciprocate through a predetermined distance rather than circulate.

The load-support member should be no means be limited to the flatbed truck 7 and the skid 14 but may include a pallet, a container, a box and so on provided that two engagement plugs 9 are provided on the underside of such load-support member.

As described above, since the load-support member is conveyed while being supported from below at a front and a rear portion thereof located on a longitudinal centerline of the load-support member, the conveyor system of the present invention requires a relatively small space for installation and occupies a relatively small vertical conveyance space. Additionally, because different types of load-support members, such as a flatbed truck and a skid in the illustrated embodiments, can be smoothly conveyed along a conveyance path including a horizontally curved portion and a sloped portion, the conveyor system of the present invention has a high degree of freedom in designing the layout of conveyance paths.

Furthermore, in a no-load conveyance line where the load-support member travels with no load carried thereon, the guide rails can be bent into a small curvature. This achieves a considerable reduction of the floor space occupied by the no-load conveyance line.

As long as two engagement plugs are provided on each load-support member, the conveyor system of the present invention is able to transfer various types of load-support members between two conveyors each having a particular construction well suited for a process to be achieved on the conveyor. Thus, the existing equipments can be used with the conveyor system of the present invention without substantive reconstruction.

In the case where the load-support member is a flatbed truck having wheels, the wheels of the flatbed truck while being transported with its overall weight supported by the drive and driven carriers are spaced from the floor surface (namely in a floating condition). This makes it possible to eliminate guide rails for supporting and guiding the wheels of the flatbed truck and support frames for supporting thereon the guide rails. As a consequence, the number of welded joint portions formed at the time of installation of the conveyor system on the floor surface can be reduced, thereby achieving a considerably cut-down of the equipment cost. Additionally, by virtue of the omission of rails and support frames, the floor surface has a little portion tending to collect dust and hence is easy to clean up.

Furthermore, owing to the use of relatively movable drive and driven carriers, the flatbed truck can remove casters which are conventionally provided in combination with the wheel for movement through a curved portion of the conveyance path. The flatbed truck is, therefore, compact and lightweight as compared to the conventional flatbed truck. Due to its small thermal capacity, such compact flatbed truck when used with an oven can improve the energy efficiency of the drying oven.

In the case where the load-support member is a skid, conveyance of the skid along a curved or undulated conveyance path can be easily achieved by the conveyor system of the present invention. As described previously, such conveyance cannot be achieved by the conventional conveyor systems using a roller conveyor, a belt conveyor and a slat conveyor.

The skid is small in height or thickness and hence can reduce the overall height (corresponding to a vertical conveyance space) of the conveyor system in which the skid is used. Additionally, since the weight ratio of the skid to the work carried thereon is smaller than that of the flatbed truck, the skid can improve the conveyance efficiency of the conveyor system.

Obviously, various minor changes and modifications of the present invention are possible in the light of the above teaching. It is therefore to be understood that within the scope of the appended claims the present invention may be practiced otherwise than as specifically described.

What is claimed is:

1. A conveyor system comprising:
   at least one guide rail;
   a flexible drag member driven to travel along said guide rail;
   a drive carrier movably supported by said rail via a first roller means rotatably mounted on said drive carrier, said drive carrier having a drive socket projecting above said guide rail, and a portion connected in driven relation to said drag member for movement along said guide rail;
   a driven carrier movably supported by said rail via a second roller means rotatably mounted on said driven carrier, said driven carrier having a driven socket projecting above said guide rail; and
   a load-support member for supporting thereon a load to be transported by said conveyor system, said load-support member having a pair of downwardly projecting engagement plugs at a front portion and a rear portion thereof, respectively, wherein one of said pair of engagement plugs is removably received in said drive socket and the other engagement plug is removably received in said driven socket, and said load-support member is driven to move in the same direction as said drive carrier while the overall weight of said load-support member is supported by said drive and drive carriers.

2. The conveyor system according to claim 1, wherein said at least one guide rail is a channel-shaped guide rail disposed with its open side facing in a horizontal directions, said drive carrier is pivotally connected at said portion to said drag member, said first roller means of said drive carrier comprises a pair of guide rollers disposed on opposite sides of said pivoted portion of said drive carrier and rotatably received in said channel-shaped guide rail, and said second roller means of said driven carrier comprises a pair of guide rollers rotatably received in said channel-shaped guide rail.

3. The conveyor system according to claim 2, wherein said at least one guide rail is a pair of channel-shaped guide rails disposed in parallel juxtaposition with their open sides facing each other in a horizontal plane, said guide rollers of said drive carrier and said guide rollers of said driven carrier are rotatably receive din each of said pair of guide rails, said first roller means further includes a pair of additional guide rollers guided by opposite longitudinal edges of upper flanges of said pair of channel-shaped guide rails, and said second roller means further includes a pair of additional guide rollers guided by said opposite longitudinal edges of said upper flanges of said pair of channel-shaped guide rails.

4. The conveyor system according to claim 1, wherein said drive socket has an upwardly open vertical engagement recess for receiving therein said one engagement plug, and an engagement surface defining part of said engagement recess and engaged with said one engagement plug to advance said load-support member when said drive carrier is driven by said drag member, said engagement recess having an upper portion opening in a forward direction of said drive carrier for accepting entry of said one engagement plug in said engagement recess from the forward direction of said drive carrier.

5. The conveyor system according to claim 4, wherein said drive socket further has a retainer surface forming a part of said engagement recess diametrically opposite to said engagement surface, said retainer surface being engageable with said one engagement plug to prevent said one engagement plug from displacing off said drive socket in said forward direction of said drive carrier.

6. The conveyor system according to claim 1, wherein said engagement recess in said drive socket has a size and configuration to allow said one engagement plug to tilt in a vertical plane within said engagement recess.

7. The conveyor system according to claim 1, wherein said driven socket has an upwardly open vertical engagement recess for receiving therein said other engagement plug, and an engagement surface defining part of said engagement recess and engaged with said other engagement plug when said drive carrier is driven by said drag member to forcibly advance said load-support member, said engagement recess having an upper portion opening in a rearward direction of said driven carrier for accepting entry of said other engagement plug in said engagement recess from the rearward direction of said driven carrier.

8. The conveyor system according to claim 7, wherein said driven socket further has a retainer surface forming a part of said engagement recess diametrically opposite to said engagement surface, said retainer surface being engageable with said other engagement plug to prevent said other engagement plug from displacing off said driven socket in said rearward direction of said driven carrier.

9. The flatbed truck conveyor system according to claim 6, wherein said engagement recess in said driven socket has a size and configuration to allow said other engagement plug to tilt in a vertical plane within said engagement recess.

10. The conveyor system according to claim 1, wherein said engagement plugs each include a vertical support shaft, and a roller rotatably mounted on said support shaft and having an annular seating flange at an upper end thereof, and wherein said drive and driven sockets each have a load-bearing surface at an upper end thereof, said load-bearing surface being in contact with said seating flange when said load-support member is carried on said drive and driven carriers.

11. The conveyor system according to claim 10, wherein each of said engagement plugs further includes an annular retaining seat made of a low friction material and disposed around said support shaft between said annular seating flange and a body of said load-support member, said retaining seat being normally separated from said annular seating flange and being brought into contact with said seating flange when said load-support member is carried on said drive and driven carriers.

12. The conveyor system according to claim 1, wherein said driven carrier is disposed on a forward side of said drive carrier when viewed from the direction of conveyance of said load-support member.

13. The conveyor system according to claim 1, further including a pair of floating restriction trolleys disposed on a forward side and a rearward side, respectively, of said driven carrier and connected to said drag member, said floating restriction trolleys being engageable with said driven carrier to restrict floating movement of said driven carrier within a predetermined range.

14. The conveyor system according to claim 1, wherein said load-support member is a flatbed truck.

15. The conveyor system according to claim 1, wherein said load-support member is a skid.

* * * * *

UNITED STATES PATENT AND TRADEMARK OFFICE
CERTIFICATE OF CORRECTION

PATENT NO. : 6,170,650 B1
DATED : January 9, 2001
INVENTOR : Morikiyo et al.

It is certified that errors appear in the above-identified patent and that said Letters Patent is hereby corrected as shown below:

Column 3, line 48, "receive din" should be --received in--;

line 54, "receive din" should be --received in--;

Column 7, line 14, "supper" should be --upper--;

Column 8, line 39, "1,12" should be --12,12--;

Column 10, line 29, "be" (first occurrence) should be --by--;

line 41, "be" (first occurrence) should be --by--;

Column 12, line 10, "directions" should be --direction--;

Column 12, line 23, "receive din" should be --received in--.

Signed and Sealed this

Twenty-ninth Day of May, 2001

NICHOLAS P. GODICI

*Attest:*

*Attesting Officer*      *Acting Director of the United States Patent and Trademark Office*

UNITED STATES PATENT AND TRADEMARK OFFICE
CERTIFICATE OF CORRECTION

PATENT NO. : 6,170,650 B1
DATED : January 9, 2001
INVENTOR(S) : Morikiyo et al.

It is certified that error appears in the above-identified patent and that said Letters Patent is hereby corrected as shown below:

Column 3,
Lines 48 and 54, "receive din" should be -- received in --;

Column 7,
Line 14, "supper" should be -- upper --;

Column 8,
Line 39, "1,12" should be -- 12,12 --;

Column 10,
Lines 29 and 41, "be" (first occurrence) should be -- by --;

Column 12,
Line 10, "directions" should be -- direction --;
Line 23, "receive din" should be -- received in --.

Signed and Sealed this

Twelfth Day of October, 2004

JON W. DUDAS
*Director of the United States Patent and Trademark Office*